(12) United States Patent
Hommel et al.

(10) Patent No.: US 9,791,890 B2
(45) Date of Patent: Oct. 17, 2017

(54) SECURE HOUSING FOR A PORTABLE COMPUTER

(75) Inventors: Peter Hommel, Bad Homburg (DE); Joerg Liebe, Wiesbaden (DE)

(73) Assignee: Lufthansa Systems AG, Kelsterbach (DE)

( * ) Notice: Subject to any disclaimer, the term of this patent is extended or adjusted under 35 U.S.C. 154(b) by 82 days.

(21) Appl. No.: 14/234,808

(22) PCT Filed: Jul. 24, 2012

(86) PCT No.: PCT/EP2012/064500
§ 371 (c)(1),
(2), (4) Date: Jan. 24, 2014

(87) PCT Pub. No.: WO2013/017477
PCT Pub. Date: Feb. 7, 2013

(65) Prior Publication Data
US 2014/0153178 A1    Jun. 5, 2014

(30) Foreign Application Priority Data

Jul. 29, 2011   (DE) .................... 20 2011 103 813 U

(51) Int. Cl.
| | |
|---|---|
| *G06F 1/16* | (2006.01) |
| *A45C 11/00* | (2006.01) |
| *A45C 13/02* | (2006.01) |

(52) U.S. Cl.
CPC ............ *G06F 1/1633* (2013.01); *A45C 11/00* (2013.01); *A45C 2011/003* (2013.01); *A45C 2013/025* (2013.01)

(58) Field of Classification Search
CPC .. G06F 1/1633; A45C 11/00; A45C 2011/003
USPC ..................................... 361/679.01, 681–683
See application file for complete search history.

(56) References Cited

U.S. PATENT DOCUMENTS

| | | | | |
|---|---|---|---|---|
| 5,586,002 A | * | 12/1996 | Notarianni | G06F 1/1626 |
| | | | | 248/920 |
| 6,212,921 B1 | * | 4/2001 | Knighton | E05B 73/0082 |
| | | | | 248/551 |
| 7,248,904 B2 | * | 7/2007 | Gartrell | A45C 11/00 |
| | | | | 379/433.01 |
| 7,495,895 B2 | * | 2/2009 | Carnevali | G06F 1/1626 |
| | | | | 361/679.26 |
| 2005/0259071 A1 | | 11/2005 | Pearlson | |
| 2008/0283114 A1 | | 11/2008 | Gray | |
| 2010/0008028 A1 | * | 1/2010 | Richardson | G06F 1/1626 |
| | | | | 361/679.01 |

(Continued)

FOREIGN PATENT DOCUMENTS

| | | |
|---|---|---|
| CN | 201557144 U | 8/2010 |
| DE | 20307127 U1 * | 7/2003 |

(Continued)

*Primary Examiner* — Tuan T Dinh
*Assistant Examiner* — Rockshana Chowdhury
(74) *Attorney, Agent, or Firm* — The Webb Law Firm

(57) ABSTRACT

A secure housing for a portable computer, which has a screen, operating keys and at least one connector, can be transferred from an open state to a closed state. In order to protect the computer and the data stored thereon, the secure housing can be locked in the closed state and conceals at least one operating key of the computer while the screen is exposed.

9 Claims, 3 Drawing Sheets

(56) References Cited

U.S. PATENT DOCUMENTS

| | | | | |
|---|---|---|---|---|
| 2011/0021937 A1* | 1/2011 | Hugh | ............... | A61B 5/0006 600/523 |
| 2012/0043234 A1* | 2/2012 | Westrup | ............... | A45C 3/02 206/320 |
| 2012/0318711 A1* | 12/2012 | Stacey | ............... | E05B 73/0082 206/775 |

FOREIGN PATENT DOCUMENTS

| | | | | |
|---|---|---|---|---|
| DE | 20307127 U1 | | 8/2003 | |
| DE | 102007053347 A1 | | 5/2009 | |
| DE | 202010011923 U1 | * | 12/2010 | ............ F16M 13/00 |
| DE | 202010011923 U1 | | 1/2011 | |
| JP | 2005-236085 A | | 9/2005 | |
| JP | 2011-514826 A | | 5/2011 | |
| WO | 2004102336 A2 | | 11/2004 | |

\* cited by examiner

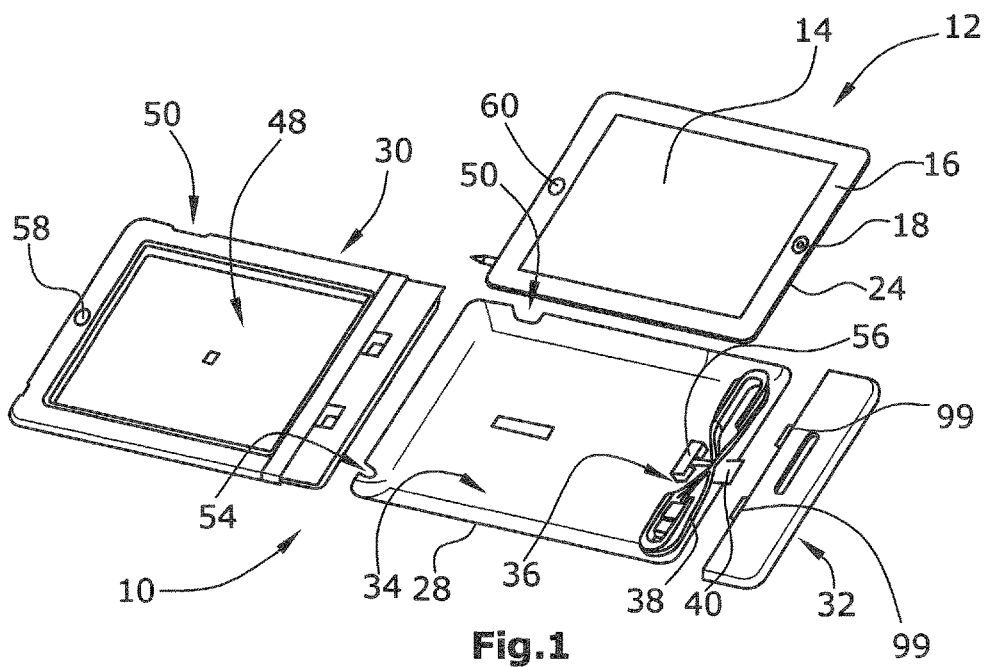
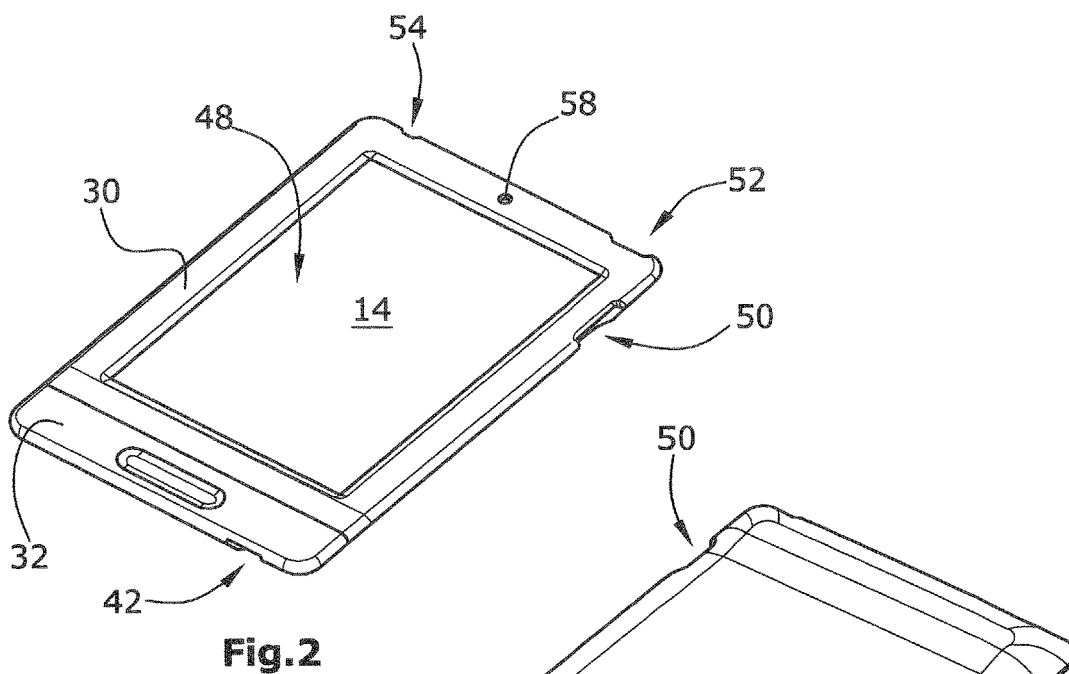
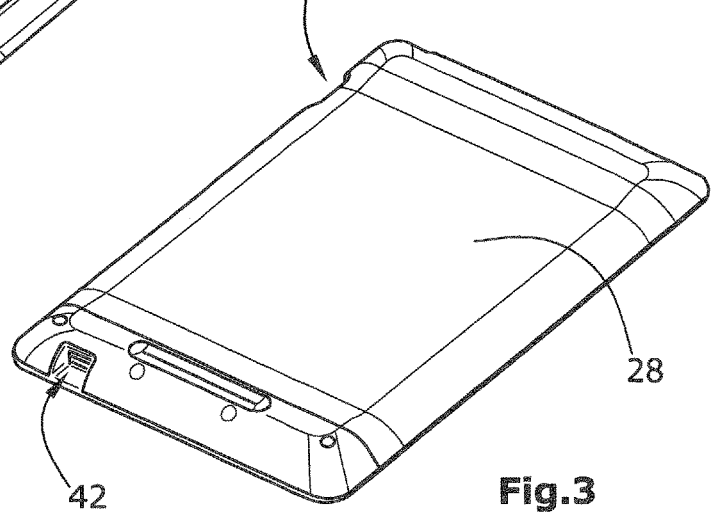

SECURE HOUSING FOR A PORTABLE COMPUTER

CROSS-REFERENCE TO RELATED APPLICATIONS

This application is the United States national phase of International Application No. PCT/EP2012/064500 filed Jul. 24, 2012, and claims priority to German Patent Application No. 20 2011 103 813.4 filed Jul. 29, 2011, the disclosures of which are hereby incorporated in their entirety by reference.

BACKGROUND OF THE INVENTION

Field of the Invention

The invention relates to a secure housing for a portable computer, e.g. a tablet computer with a touchscreen.

Description of Related Art

When lodging or transporting persons, e.g. on a flight, it is desirable to lend these persons a portable computer, preferably in the form of a tablet computer with a touchscreen, such as an iPad, for example. In the context of air travel, the flight passengers are thus enabled to access an on-board entertainment network via this lent computer so that they can watch movies stored on a central network server. The lent computers can maintain a radio link with the network server, for example via WLAN. As an alternative, it is also conceivable that movies or music to be played back are stored on the lent computer and are intended to be retrievable from the same.

Access to basic settings of the lent computer and to the movie and music data stored thereon shall be prevented. Further, the risk of damage to the computer shall be avoided.

SUMMARY OF THE INVENTION

The secure housing is adapted to be moved from an open state into a closed state and is adapted to be locked in the closed state. In the closed state the housing covers at least one operating key of the computer and exposes the screen of the same. The operating key covered may be a main operating key by means of which basic settings of the computer are made. Owing to the fact that this operating key is covered in the closed state, access to the operating key, and thus access to basic settings of the computer, is prevented. Nevertheless, movies and other data can be displayed visually on the exposed screen. The user can use the portable computer to watch information on the screen, such as movies or texts, while the operability of the computer and in particular the modifiability of basic settings is restricted.

Preferably, the secure housing comprises an electric plug contact accessible from outside the housing and comprising an electric wire adapted to be connected with the socket of the computer. In the closed state of the secure housing the socket of the computer is protected, while it is still accessible from outside via the electric plug contact and the electric wire. Here, in the closed state of the housing, the wire and the plug contact are preferably completely contained within the housing so that the risk of a mechanical damage to the wire and/or the plug contact is avoided.

It is particularly advantageous, if the wire is configured exclusively for the voltage supply to the computer and does not allow data transmission. At a portable tablet computer, such as an iPad, for example, electrical sockets are typically configured for the voltage supply to the computer and for the transmission of data as a data interface. With the housing closed, the user can supply electrical voltage to the computer without being able to download data from the computer or to transfer data onto the computer. Preferably, all data interfaces of the computer, such as USB ports, for example, are not accessible in the closed state of the secure housing or are at least not available for data transmission. In this way, data can be stored on the lent computer and can be made available to the user, without the risk of the data being stolen or manipulated by the user.

Further, it is conceivable that the secure housing covers an on/off switch of the computer in the closed state. Preferably, a headphone connector, speakers and possibly also volume controls should not be covered in the closed state, but should be freely accessible to the user.

The secure housing can provide mechanical protection, heat protection and/or moisture protection for the computer.

Preferably, the secure housing is of a three-part structure with a lower shell and two upper covers. The lower shell has a holder for the computer and another holder for the electric wire. The first upper cover forms a cover for the lower shell and can be connected with the same to cover the computer. The second upper cover also forms a cover for the lower shell and can be connected with the same to close the cable holder. Preferably, the first upper cover is removable only when the second upper cover has been removed, said second upper cover being adapted to be latched to the bottom shell and to be locked in the latched state. For opening the secure housing, the second upper cover is removed first and access to the electric wire is made possible before the first upper cover can be removed to allow access to the computer.

BRIEF DESCRIPTION OF THE DRAWINGS

The following is a detailed description of two embodiments of the invention with reference to the Figures. In the Figures:

FIG. 1 is an exploded view of a first embodiment of the secure housing according to the present invention and of a portable computer, FIG. 2 is a perspective top plan view on the secure housing of FIG. 1 in the closed state, FIG. 3 is a perspective bottom view of the housing of FIG. 1 in the closed state.

DESCRIPTION OF THE INVENTION

Figure 4:
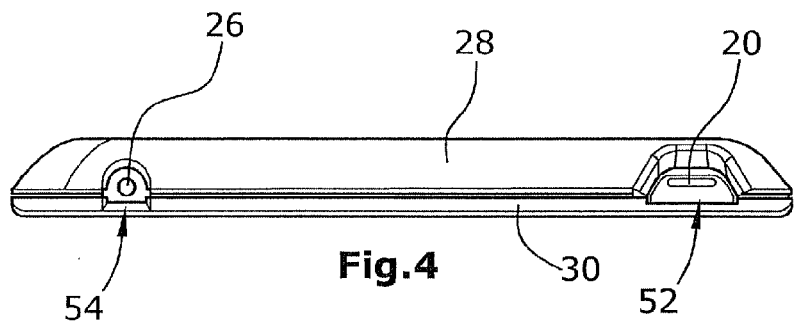
FIG. 4 is a first side elevational view of the secure housing of FIG. 2.
Figure 5:
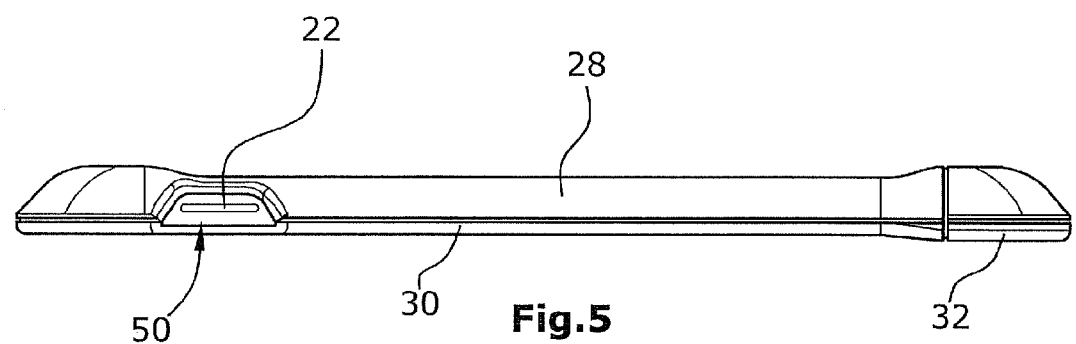
FIG. 5 is a second side elevational view of the secure housing of FIG. 2.
Figure 6:
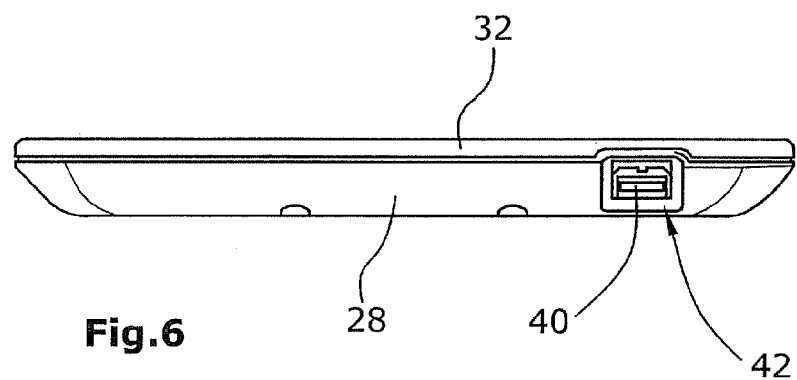
FIG. 6 is a third side elevational view of the secure housing.

The secure housing 10 serves to accommodate the portable computer 12 in the form of an iPad or another tablet computer illustrated in FIG. 1. The computer 12 comprises a screen 14 in the form of a touch-sensitive touchscreen, and a housing 16. The computer housing 16 is provided with operating keys 18, 20, 22 for operating the computer. Here, the operating key 18 is a main operating button which allows access to menus with which computer settings can be made or modified. The operating key 20 is an on/off switch. The operating key 22 is a volume control. The computer housing further comprises a socket 24 configured according to the USB standard for voltage supply and data transmission. Further, a headphone connector 26 is provided.

The secure housing 10 is formed by a lower shell 28, a first upper cover 30 and a second upper cover 32. The lower shell 28 is provided with a holder 34 for the computer and a holder 36 for an electric wire 38.

In the region of the holder 34, the lower shell 28 is formed to accurately fit the shape of the rear housing 16 of the computer 12. When placed into the holder 34, the computer 12 is fully and snugly received in the lower shell 28. The computer 12 can be screwed to the lower shell 28 by means of screw connections. When the computer 12 is in a state in which it is accommodated in the holder 34, the first upper cover 30 can be set on the lower shell 28 and be fastened to the lower shell 28 such that the holder 34 for the computer is covered completely by the first upper cover except for the area of the screen 14. The holder 36 for the wire 38 is still freely accessible at that time. For closing the wire holder 36, the second upper cover 32 is set on the lower shell 28 and is connected with the first upper cover 30 and the lower shell 28 through plug-in connectors 99. The wire cover 32 can be locked and cannot be removed when in the locked state so that it does not release the first upper cover 30 either. For instance after the computer has been lent to a passenger, the key 98 for opening the locked state of the wire cover 32 and the lower shell 28 can be kept by the cabin crew.

The electric wire 38 is provided with an electric plug contact 40 releasably fastened at the lower shell 28. When fastened to the lower shell 28, the plug contact 40 is exposed in a recess 42 of the secure housing 10 and is thereby freely accessible from outside the secure housing 10. The end of the electric wire 38 opposite the plug contact 40 is provided with a contact socket 56 for connection with the plug socket 24 of the computer 12. The electric wire 38 exclusively allows for the voltage supply to the computer 12, while data transmission is prevented. Thus, it is merely possible to establish a voltage supply to the computer 12 via the electric wire 38 and the plug contact 40, and electronic data can neither be downloaded from the computer 12 nor can they be transmitted onto the computer 12 from outside. The data stored on the computer 12 cannot be accessed via the electric plug contact 40.

Similarly, in the closed state of the secure housing 10, illustrated in FIGS. 2 to 6, the on/off switch 20, the volume control 22 and the headphone connector 26 are each exposed via a recess in the secure housing 10 and are therefore freely accessible from outside. For operation, the screen is freely accessible through the recess 48 in the computer cover 30.

The secure housing 10 is provided with a foldable support not illustrated in the Figures, which allows for a safe positioning of the computer 12. For example, a passenger may thus place the computer on a foldaway tray often mounted to the backrest of the respective frontward seat.

Figure 7:
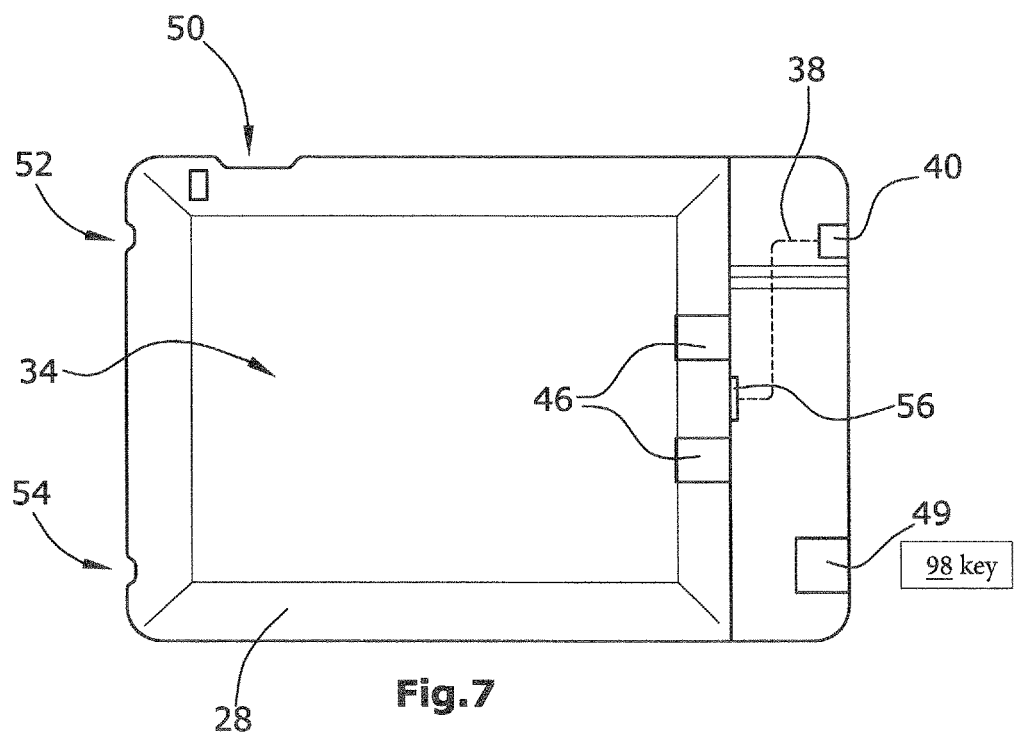
FIG. 7 is a top plan view on the lower shell of a second embodiment and FIG. 8 is a top plan view on the top cover of the second embodiment.
Figure 8:
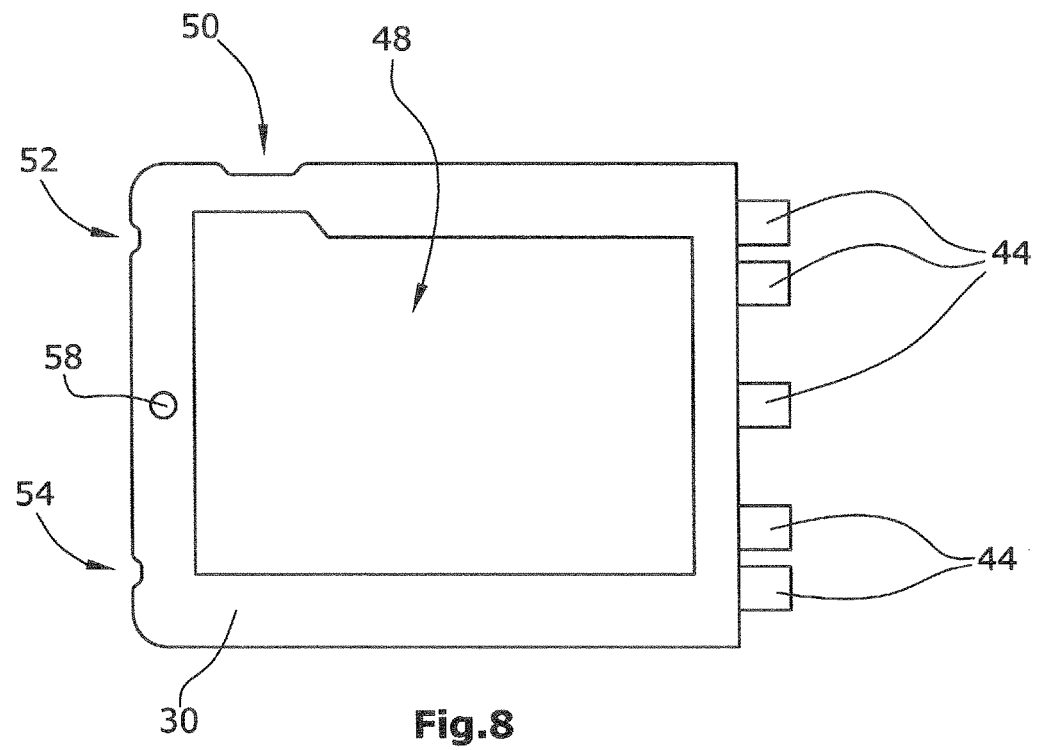

The second embodiment, illustrated in FIGS. 7 and 8, differs from the first embodiment in FIGS. 1 to 6 in that the secure housing 10 is not formed by three parts but merely by two parts, with the second upper cover 32 for the wire 38 and for the plug contact 40 being an integral part of the lower shell 28 and being integrally and rigidly connected with the same. For the rest, as in the first embodiment, the lower shell 28 comprises a holder 34 for the computer 12, the first upper cover 30 being adapted to be set on the lower shell 28 and to be fastened to the lower shell 28 such that the holder for the computer is covered by the first upper cover. For this purpose, the upper cover 30 is provided with fixing lugs 44 engaging with fixing lugs 46 on the lower shell 28 in order to keep an fix the cover 30 on the lower shell 28. The lower shell 28 is provided with a lock 49 for locking the upper cover 30 in the closed state so that the cover 30 cannot be removed from the lower shell 28 in the closed state.

The computer cover 30 of the second embodiment is also provided with a cutout 48 for the computer screen so as to allow the operation of the screen as a touchscreen in the closed state of the secure housing 10. Further, the lower shell 28 and the computer cover 30 are each provided with a recess 50 for a volume control of the computer, a recess 52 for the on/off switch of the computer and with a recess 54 for the headphone connector of the computer. These elements correspond to those of the first embodiment in their arrangement and function.

Likewise, as in the first embodiment, the lower shell is provided with a plug contact 40 and an electric wire 38. The only difference to the first embodiment is merely that the wire 38 is shorter and, together with an electric contact socket 56 for the computer socket 24, is fixedly connected with the lower shell 28, while the wire 38 and the contact socket 56 in FIG. 1 are removable and are illustrated in a wound state.

As in the first embodiment, the computer cover 30 is provided with an opening 58 for a light sensor 60 of a computer 12. In the closed state of the secure housing 10, the computer 12 can receive sufficient light via its light sensor 60 even through the opening 58 to adjust the illumination of the screen 14 to the ambient light conditions, for example.

The invention claimed is:

1. A secure housing for a portable computer, wherein the portable computer comprises a screen, at least one main operating key, at least one other operating key, and at least one socket, wherein said secure housing transfers from an open state to a closed state,
   wherein the secure housing locks in the closed state, covers the at least one main operating key of the portable computer in the closed state, prevents operation of the at least one main operating key of the portable computer in the closed state, and exposes the screen in the closed state, and wherein the secure housing exposes and enables operation of the at least one other operating key of the portable computer in the closed state,
   wherein the secure housing comprises a lower shell, a first upper cover, and a second upper cover, wherein the lower shell includes a holder for the portable computer and a holder for an electric wire of the portable computer,
   wherein the lower shell is formed to fit a shape of a rear housing of the portable computer such that when the portable computer is placed in the holder for the portable computer, the portable computer is fully and snugly received in the lower shell, wherein the first upper cover is placed on the lower shell and fastened to the lower shell such that the holder for the portable computer is covered completely by the first upper cover except for the area of the screen, and the holder for the electric wire is still freely accessible,
   wherein the second upper cover is placed on the lower shell to cover the electric wire and connect with the first upper cover and the lower shell through plug-in connectors,
   and wherein the second upper cover is latched to the lower shell, wherein the lower shell comprises a lock that locks the secure housing in the closed state such that the second upper cover is irremovable from the lower shell and the second upper cover is prevented from releasing the first upper cover, wherein the lock unlocks with a key such that the second upper cover is removable from the lower shell and the second upper cover allows release of the first upper cover.

2. The secure housing of claim 1, wherein the secure housing further comprises an electric plug contact accessible from outside the secure housing, said contact comprising the electric wire, wherein the electric wire connects with the at least one socket of the portable computer.

3. The secure housing of claim 2, wherein the electric wire and the plug contact are completely included within the secure housing when the secure housing is in the closed state.

4. The secure housing of claim 3, wherein the electric wire exclusively provides a voltage supply to the portable computer and does not provide data to the portable computer.

5. The secure housing of claim 4, wherein the secure housing provides mechanical protection, heat protection, and/or moisture protection.

6. A portable computer comprising a screen, one or more operating keys, at least one socket, and the secure housing of claim 1 adapted to be transferred from the open state to the closed state, the portable computer having the at least one main operating key provided for making basic settings, wherein in the closed state, the secure housing covers the at least one main operating key such that an operation of the at least one main operating key is prevented and exposes the screen, and wherein the portable computer has the at least one other operating key provided for making non-basic settings, wherein in the closed state, the secure housing exposes the at least one other operating key and enables an operation of the at least one other operating key.

7. The portable computer of claim 6, wherein the portable computer has an on/off switch covered by the secure housing in the closed state.

8. The portable computer of claim 6, wherein the screen is a touchscreen that can be operated in the closed state of the secure housing.

9. The portable computer of claim 6, wherein the portable computer has a headphone connector and, optionally, volume controls which are accessible from outside in the closed state of the secure housing.

* * * * *